United States Patent [19]

Hausdörfer

[11] Patent Number: 4,947,240
[45] Date of Patent: Aug. 7, 1990

[54] METHOD AND CIRCUIT APPARATUS FOR COMBINING TWO TELEVISION SIGNALS

[75] Inventor: Michael Hausdörfer, Mühltal, Fed. Rep. of Germany

[73] Assignee: Robert Bosch GmbH, Stuttgart, Fed. Rep. of Germany

[21] Appl. No.: 325,777

[22] Filed: Mar. 20, 1989

[30] Foreign Application Priority Data

Mar. 26, 1988 [DE] Fed. Rep. of Germany ....... 3810328

[51] Int. Cl.⁵ .............................................. H04N 9/74
[52] U.S. Cl. ..................................... 358/22; 358/105; 358/38
[58] Field of Search ...................... 358/22, 105, 69, 36, 358/138

[56] References Cited

U.S. PATENT DOCUMENTS 4,300,162 11/1981 Robers ................................ 358/138
4,549,213 10/1985 Illetschko .............................. 358/36

FOREIGN PATENT DOCUMENTS 62-135094 6/1987 Japan .
2109193 5/1983 United Kingdom .................. 358/22

Primary Examiner—Howard W. Britton
Assistant Examiner—Amir Zarabian
Attorney, Agent, or Firm—Frishauf, Holtz, Goodman & Woodward

[57] ABSTRACT

A decision signal for switching or fading between foreground and background television signals in accordance with the chroma-key method is subjected to vertical scan delay filtering for line signal averaging in television signals to avoid disturbance of the decision signal by results of the field interlace feature of a standard television signal. The delay for such filtering is provided by a random access digital memory and provides a delay of one period of the vertical scan frequency. Filtering is obtained by averaging delayed and undelayed output of the chromakey color selection signal or by recursively filtering that signal utilizing the same period and type of delay.

9 Claims, 1 Drawing Sheet

METHOD AND CIRCUIT APPARATUS FOR COMBINING TWO TELEVISION SIGNALS

CROSS-REFERENCE TO RELATED COPENDING APPLICATION

Uwe Riemann and Gerd Brand, U.S. Ser. No. 07/154,913, filed Feb. 11, 1988.

This invention concerns a combination of two television signals in accordance with the chroma-key system, which is incidentally described in the above cross-referenced copending application.

Electronic feeding in of a color background is frequently used as a useful aid for changing scenes in television production. Within the time frame of a television picture boundary decisions are made, in this procedure, between two different picture contents. The decision between foreground and background is preferably carried out by the color range of the foreground. For this purpose there is in most cases used a monotone background color surface of which the color saturation is very high and of which the hue does not appear in the picture-significant parts of the foreground.

By evaluation of the color extraction signals of the foreground picture signal source, a decision magnitude is derived from the picture content by which the switching over or fading between the foreground and background signals may be carried out. This evaluation takes place in the time frame of a picture field, a procedure that has led to certain disturbances in current use heretofore. These disturbances, which show up are as contour and flicker disturbances, become more and more prominent, the more the overall picture quality is improved. The chief cause of this disturbance is the transmission of television signals according to present day standards providing for the conventional line jump picture field interlace. This signifies that after continuous scanning in the horizonal direction and after time-discrete scanning in the vertical direction, a first picture field is produced having 287.5 active lines, in the PAL standard for instance, and the second picture field follows after the course of the presentation of the first field offset by 180° in the vertical, so that as seen timewise, a picture field offset structure of the two fields results. The total number of active lines in an NTSC picture is somewhat less than in the PAL system, but likewise is an odd number, so that each field does not have an integral number of lines and the same offset results, although there is no color carrier phase reversal at the field frequency.

Referring again to the PAL system, for example, the equivalent scanning frequency in the vertical direction in a picture field is 7.37 MHz, so that vertical local frequencies up to 3.68 MHz are processed without spectral overlap, but higher frequencies are processed with overlap, which leads to visible disturbance structures in the picture. Assuming linear transmission, disturbance structures are visible in the presence of the same vertical frequencies, however with 180° phase change to those of the first picture field, so that normally there is an averaging out visually. This known method makes it important to avoid movements in the picture or abrupt contrast changes of boundaries only slightly inclined to the horizontal or with vertical local frequency content. With reference to the decision signal this signifies that along with the foreground-background switch-over function artifacts are also included which impair the decision threshold because step structures or flicker-producing timing uncertainties are also involved.

SUMMARY OF THE INVENTION

It is an object of the present invention to provide a method and circuit apparatus for avoiding these disturbances of the decision signal which electronically switches from the foreground to the background at the right instants.

Briefly the decision signal is subjected to vertical scan period delay filtering, as defined below, for line signal averaging. This has the advantage that the uncertainties of reaching a decision are avoided. Artifacts of vertical scanning which have 180° phase difference are eliminated. Furthermore, an averaging of random fluctuations with which the picture signal generation is affected is also performed which is equivalent to an improvement of the disturbance margin (by about 3dB). In this way the decision threshold is more sharply defined and the desired quality improvement is obtained.

The vertical scan period delay filtering may be carried out by combining the half signal amplitude of the current picture field with the half signal amplitude of the delayed previous picture field. It may also be performed by recursive filtering, through a comparable delay, of the raw decision signal.

The circuit apparatus aspects of the invention are described below in an illustrave description.

BRIEF DESCRIPTION OF THE DRAWINGS

The invention is now described by way of illustrated example with reference to the annexed drawings, in which.

DESCRIPTION OF THE ILLUSTRATED EMBODIMENTS

. The circuit block diagram of FIG. 1 shows a circuit for carrying out the so-called linear chroma-key procedure, which is sometimes known as the soft key method because by it the switching between foreground and background signals, is not abrupt but blended or "faded".

Figure 1:
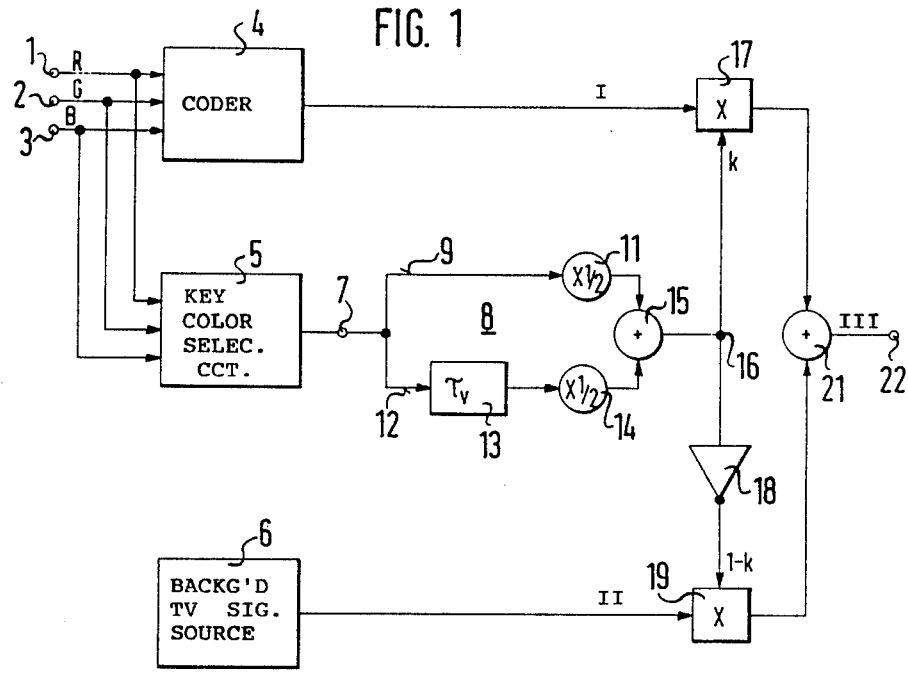
FIG. 1 is a block circuit diagram of apparatus for carrying out the method of the invention.

A first picture field generator, for example a color television camera not shown in the figure, produces color value video signals R, G and B which are made available at the terminals 1, 2 and 3 of FIG. 1. These signals are then led on one hand to a coder 4 for generating a first composite television signal I according to a television signal standard and on the other hand to a key color hue extraction or selection circuit 5 for generation of a corresponding decision signal. In addition a second picture signal generator, for example a magnetic tape recorder installation 6, is provided from which a second color television signal II is generated according to the same standard as the signal I. The first color television signal I now serves a foreground signal having its own background and the second color television signal II, serves as a background signal.

At the output 7 of the color hue selection circuit 5, the details of which have already been thoroughly described in the technical literature and therefore do no need to be further described here, a decision signal is made available . As is known, the decision signal has a first logic state when a selected key color, for example blue (when a blue wall represents the background incorporated in the first color TV signal I) and has the other logical state when the currently transmitted picture element (pixel) is of any other color. This decision signal is now supplied to a filter circuit 8 in which there is a first circuit branch 9 containing an attenuation stage 11 reducing the amplitude of the decision signal by one half and a second circuit branch 12 containing a picture field delay unit 13 as well as the second attenuation stage 14 for reducing the amplitude of the delayed decision signal by one-half. The outputs of the attenuation stages 11 and 14 are respectively connected to the inputs of an addition stage 15, at the output 16 of which a decision signal is made available which is free of disturbances e.g. free of so called artifacts.

The picture field delay unit 13 in this case consists of a random access digital memory (RAM) and provides a delay period of, for example, 20 milliseconds. If the color value signals R, G and B and likewise the decision signal are not present in digital form, it would be necessary to provide, in the second branch 12 of the filter circuit 8, in advance of the RAM, a band limiting filter for satisfying the Nyquist condition for sampling analog signals followed by an analog to digital converter for digitizing the decision signal. In that case digital to analog conversion followed by filtering would have to be provided following the RAM for the delayed signal so that thereafter the delayed decision signal would again be available in analog signal form, so that it can be combined with the undelayed signal of the first signal branch 9 of the filter circuit 8. The disturbance-free decision signal is then processed in a manner already known as such, on the one hand by supplying it to an input of a first multiplier stage 17, to the other input of which the foreground signal I is applied, and on the other hand through an inverter 18 to the input of a second multiplier stage 19, to the other input of which the background signal II is applied. The outputs of the multiplier stages 17 and 19 are connected to the inputs of an addition stage 21, at the output of which the television signal III is available, which consists in part of foreground signal and in part of the background signal.

Since an essentially monochrome color selection signal is obtained in the circuit 5 from the RGB signals before encoding for PAL or NTSC standard signals, the one-picture-field delay in the unit 13 does not have to contend, in the PAL case, with a color carrier phase reversal and of course the addition of the standard television signals in the unit 21 is always for color-cophased fields when PAL signals are used.

Of course the disturbance-free decision signal available at the output 16 can also be supplied to a likewise known switchover unit which does not fade the foreground into and out of the background signal by means of a fading factor k, but simply switches from one to the other.

Figure 2:
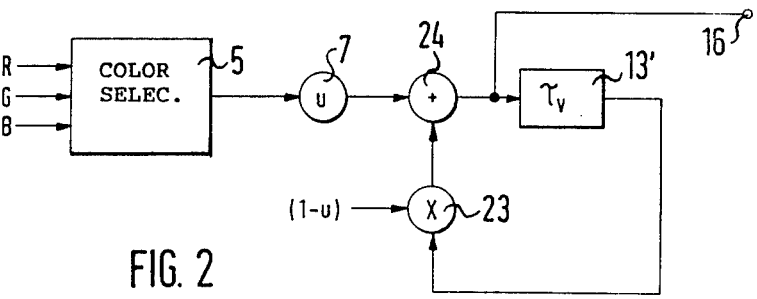
FIG. 2 is a diagram of an additional variant of filtering in accordance with the invention.

FIG. 2 shows another variety of filter which may be substituted for the filter circuit 8 of FIG. 1. In FIG. 2 the output 7 of the color hue selection circuit is connected to a so-called recursive (digital) filter. This recursive filter likewise has a picture field delay unit 13', but the output thereof is differently multiplied in a multiplier stage 23, because at the other input thereof there is provided the value which is complementary to the decision signal available at the terminal 7. the output of the multiplier stage 23 is connected to an addition stage 24, of which the other input is connected to the output terminal 7. The output of the stage 24 is connected on the one hand to the input of the picture field delay unit 13' and on the other hand to the output terminal 16 for the disturbance-free decision signal.

Although the invention has been described with reference to particular illustrative embodiments, it will be recognized that further variations and modifications are possible within the inventive concept.

The expression "vertical scan period delay filtering," as already made clear, is used as an expression which includes line averaging, of which FIG. 1 is a nonlimiting example, and recursive filtering, of which FIG. 2 is a nonlimiting example.

I claim:

1. Method for combining a foreground television signal with a background television signal by the chromakey procedure comprising the steps of:
    deriving a first decision signal from the foreground television signal by reference to a color selection signal thereof;
    subjecting said first decision signal so derived to vertical scan period delay filtering for line signal averaging to produce a second decision signal free of disturbance by interlace pattern effects, and
    utilizing said second decision signal for switching or fading said foreground television signal in and out of said background television signal.

2. Method according to claim 1, wherein said vertical scan period delay filtering is produced by additive combination of respective half-amplitude first decision signals of a current picture field and of an immediately preceding picture field.

3. Method according to claim 2, wherein said first decision signal is in digital form at least for the purpose of producing a delayed first decision signal of a preceding picture field.

4. Method according to claim 1, wherein the vertical scan period delay filtering of said first decision signal is performed by recursive filtering.

5. Method according to claim 1, wherein said first deciion signal is a signal in digital form.

6. Apparatus for combining a first color television signal with a second color television signal by the chromakey method, wherein color-selective means are provided for deriving a first decision signal from said first color television signal, comprising, in combination:
    a first attenuation stage (11) to which said first decision signal is provided as an input, for reducing said first decision signal amplitude by half and providing a reduced decision signal at its output;
    means for delaying said first decision signal for the period of vertical scan of said television signals (13) said means having said first decision signal as an input and providing a delayed decision signal at an output;
    second attenuation means (12) having an input connected to said output of said delaying means for reducing by half the amplitude of said delayed first decision signal and providing a reduced delayed decision signal at its output, and
    means for adding together said reduced first decision signal and said reduced delayed decision signal and producing therefrom a second decision signal freed of disturbances at least partly caused by picture field interlace.

7. Apparatus according to claim 6, wherein said delaying means is constituted as a random access memory for digital signals and, if needed for processing said first decision signal, is preceded by an analog to digital converter and followed by a digital to analog converter provided in said apparatus.

8. Apparatus for combining two color television signals by the chromakey method, wherein said television signals are a background signal and a foreground signal and wherein means are provided for deriving a first decision signal from said foreground signal, and comprising recursive filter means having an input and including delay means having a propagation time of a vertical scan period and means for multiplying a delayed decision signal obtained at the output of said delay means by a value which is complementary to the value of said first decision signal, to produce a complementary delayed decision signal and means for adding said first decision signal to said complementary delayed decision signal to produce a disturbance-free second decision signal for use in chromakey television signal combination which is also supplied to said input of said delay means.

9. Apparatus according to claim 8, wherein said delay means is constituted as a random access memory for digital signals.

* * * * *